(12) United States Patent
Postberg

(10) Patent No.: US 9,335,189 B2
(45) Date of Patent: May 10, 2016

(54) APPARATUS FOR INTRODUCING AN OBJECT INTO A PIPE

(75) Inventor: Hans-Jürgen Postberg, Bad Nauheim (DE)

(73) Assignee: Postberg + Co. Druckluft-Controlling GmbH, Kassel (DE)

( * ) Notice: Subject to any disclaimer, the term of this patent is extended or adjusted under 35 U.S.C. 154(b) by 337 days.

(21) Appl. No.: 13/979,769

(22) PCT Filed: Jan. 16, 2012

(86) PCT No.: PCT/EP2012/050585
§ 371 (c)(1),
(2), (4) Date: Jul. 15, 2013

(87) PCT Pub. No.: WO2012/098084
PCT Pub. Date: Jul. 26, 2012

(65) Prior Publication Data
US 2013/0291663 A1 Nov. 7, 2013

(30) Foreign Application Priority Data
Jan. 17, 2011 (DE) ...................... 20 2011 000 102 U

(51) Int. Cl.
| | | |
|---|---|---|
| F16L 41/00 | (2006.01) | |
| G01D 11/30 | (2006.01) | |
| F16L 41/16 | (2006.01) | |
| F16L 55/46 | (2006.01) | |

(52) U.S. Cl.
CPC .............. *G01D 11/30* (2013.01); *F16L 41/008* (2013.01); *F16L 41/16* (2013.01); *F16L 55/46* (2013.01)

(58) Field of Classification Search
None
See application file for complete search history.

(56) References Cited

U.S. PATENT DOCUMENTS

| 3,995,664 | A | * | 12/1976 | Nelson | ............................ 138/43 |
| 4,177,676 | A | | 12/1979 | Welker | |
| 2007/0073270 | A1 | * | 3/2007 | Christensen et al. | ......... 604/533 |
| 2008/0001395 | A1 | * | 1/2008 | Kouda | ............................ 285/33 |

FOREIGN PATENT DOCUMENTS

| DE | 26 53 012 A1 | 5/1978 |
| EP | 0 882 896 A1 | 12/1998 |

OTHER PUBLICATIONS

International Search Report (in German with English translation) for PCT/EP2012/050585, mailed Jun. 8, 2012; ISA/EP.

* cited by examiner

*Primary Examiner* — Robert R Raevis
(74) *Attorney, Agent, or Firm* — Harness, Dickey & Pierce, P.L.C.

(57) ABSTRACT

A device for introducing an object into a pipe is disclosed. The device includes a guide that is disposed on a pipe and a positioning unit that is movably guided on the pipe in an introduction direction by means of the guide. The positioning unit that supports a carrier that can be introduced into the pipe by moving the positioning device in the introduction direction. The positioning device is coupled to the pipe with a linear one-way clutch operable in a blocked state when the positioning device is moved against the introduction direction.

19 Claims, 11 Drawing Sheets

APPARATUS FOR INTRODUCING AN OBJECT INTO A PIPE

CROSS-REFERENCE TO RELATED APPLICATIONS

Figure 1:
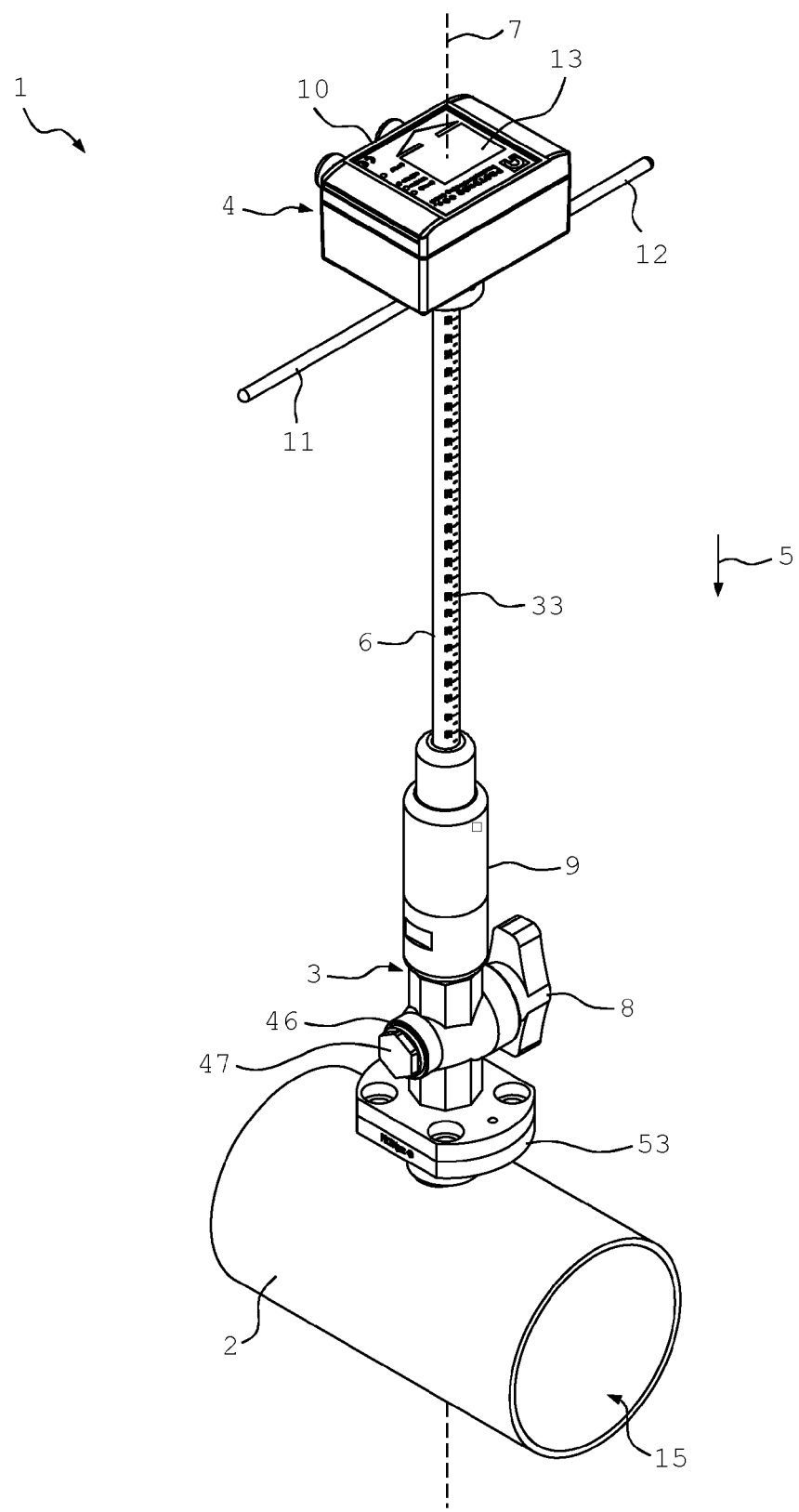

This application is a 371 U.S. National Stage of International Application No. PCT/EP2012/050585, filed Jan. 16, 2012, and claims priority to German Patent Application No. 20 2011 000 102.4, filed Jan. 17, 2011, the disclosures of which are herein incorporated by reference in their entirety.

The invention relates to an apparatus for introducing an object into a pipe, comprising a guide that is securely connected to the pipe or is formed by the latter and a positioning device that is displaceably guided on the pipe in an introduction direction by means of the guide and that carries or forms the object, which latter can be introduced into the pipe by displacing the positioning device in the introduction direction.

If the object is introduced into the pipe by an operator by displacing the positioning device in the introduction direction if a pressurised fluid, for example compressed air, is charged into the pipeline, then the operator must not release the positioning device since otherwise the positioning device would be forced back against the introduction direction on account of the pressure. The operator must therefore hold the positioning device against the pressure exerted by the fluid until the device has been secured in the desired position on the pipe. This activity is laborious for the operator and complicates the introduction of the object into the pipe.

Starting from this background the object of the invention is to facilitate, with an apparatus of the type mentioned in the introductory paragraph, the introduction of the object into the pipe into which is charged a fluid under pressure.

This object is achieved according to the invention with an apparatus according to claim 1. Preferred developments of the invention are given in the sub-claims.

The apparatus according to the invention for introducing an object into a pipe comprises a guide that is securely connected to the pipe or is formed by the latter and a positioning device that is displaceably guided on the pipe in an introduction direction by means of the guide and that carries or forms the object, the object being able to be introduced into the pipe by displacing the positioning device in the introduction direction, wherein the positioning device is connected to the pipe with the interconnection of a linear one-way clutch, which adopts its blocking state when the positioning device is displaced against the introduction direction.

Due to the linear one-way clutch a displacement of the positioning device in the direction opposite to the introduction direction is blocked or can be blocked. Accordingly an operator can release the positioning device when introducing the object into the pipe, without the danger that the positioning device being forced back against the introduction direction on account of the pressure. The linear one-way clutch thus forms a non-return security lock for the positioning device. On displacing the positioning device in the introduction direction the one-way clutch on the other hand adopts in particular its one-way state. A displacement of the positioning device in the introduction direction is thus allowed by the one-way clutch.

According to a development of the invention the one-way clutch includes an operable release device, by means of which the blocking state can be deactivated. In particular it is possible by actuating the release device to displace the positioning device against the introduction direction. The object can thus be withdrawn from the pipe, for example for the purpose of repair, maintenance or replacement.

According to a development of the invention the guide and/or the one-way clutch includes a clamping device, by means of which the positioning device can be fixed on the pipe. Accordingly it is possible to fix the object in a desired position in the pipe without a further insertion of the object in the pipe being possible. The clamping device is preferably releasable, so that the object can be displaced in the introduction direction in the released state of the clamping device. Preferably the clamping device is or will be released in the actuated state of the release device, so that the object can be removed from the pipe. Advantageously the release device and the clamping device are coupled to one another in such a way that the clamping device is released in the activated state of the release device.

The one-way clutch can in the blocking state engage in a positive engagement manner with the positioning device. In this case the one-way clutch is designed for example in the form of a ratchet-and-pawl one-way clutch. Preferably however the one-way clutch is designed as a clamping one-way clutch, so that a step-less positioning of the positioning device is possible. In particular the one-way clutch includes a clamping mechanism, which is preferably actuated or can be actuated by displacement of the positioning device.

The one-way clutch is in particular securely connected to the guide and/or to the pipe. Furthermore the one-way clutch can be provided separately from the guide. According to an alternative embodiment the guide includes the one-way clutch and/or the one-way clutch and the guide are formed combined with one another, so that in particular a more compact construction of the apparatus according to the invention can be achieved. Furthermore it is possible for the one-way clutch to form the guide.

According to a modification of the invention the positioning device includes a receptacle that can be inserted into the pipe in the introduction direction, on which is arranged the end region of the object facing towards the pipe. In particular the receptacle is formed elongated, preferably elongated in the introduction direction. Preferably the receptacle includes a tube or is formed as a tube, so that in particular electrical leads connected to the object can be guided through the interior of the tube. It is thus possible to avoid having to lay such leads on the outer circumference of the receptacle, which could lead to sealing problems. Preferably the positioning device is displaceably guided on or in the guide in the introduction direction by means of the receptacle, the receptacle advantageously being sealed against the guide preferably by means of one or at least one sealing ring.

According to a modification of the invention the positioning device includes a locking component that co-operates with the one-way clutch. The locking component serves in particular to hold the positioning device on the one-way clutch in the blocking state of the one-way clutch, so that a movement of the positioning device against the introduction direction is blocked. Preferably the locking component has, at least in the region of the one-way clutch, a constant or substantially constant outer circumference or diameter in the longitudinal direction. Preferably the locking component has, at least in the region of the one-way clutch, a cylindrical or substantially cylindrical outer circumferential surface.

According to a first variant of the invention the locking component is formed by the receptacle. In this way a particularly compact construction of the apparatus according to the invention is achieved. According to another variant of the invention the locking component is securely connected to the receptacle. In this case the locking component is provided in particular in addition to the receptacle and preferably forms a separate structural part. For example a conventional apparatus for introducing an object can thus be retrofitted in the manner according to the invention. The locking component is formed for example by one or at least one traction means, for example by one or at least one cables, which is/are preferably securely connected to the receptacle. The formation of the locking component as a cable has the advantage that when the diameter of the pipe is large, it can be flexibly guided over the latter.

According to a development of the invention the one-way clutch includes a housing, through which the locking component extends in a longitudinal direction. In particular one or at least one clamping surface inclined or curved in the longitudinal direction is/are provided in the housing, wherein at least one movable clamping element is arranged between the clamping surface and the locking component, which clamping element abuts the locking component and also the clamping surface. In this way it is possible to realise the linear one-way clutch as a clamping one-way clutch. In particular the locking component is displaceable in the longitudinal direction relative to the housing, whereas a displacement of the locking component in a direction opposite to the longitudinal direction is blocked or can be blocked by co-operation of the clamping element with the locking component and the clamping surface. The distance between the clamping surface and the locking component increases in particular in the longitudinal direction. According to a development of the invention the clamping surface is formed by a conical internal circumferential surface of the housing in the longitudinal direction. Preferably the clamping surface tapers in a direction opposite to the longitudinal direction. Advantageously the longitudinal direction extends in the introduction direction and/or coincides with this.

Preferably a displaceable sleeve is arranged in the housing, in which the clamping element is mounted and through which the locking component extends in the longitudinal direction.

The sleeve is in particular displaceable in the longitudinal direction and/or contrary to the longitudinal direction relative to the housing. Preferably the locking component is furthermore displaceable relative to the sleeve in the longitudinal direction. Advantageously one or at least one through hole extending transversely or inclined to the longitudinal direction is provided in the wall of the sleeve, in which the clamping element is enclosed. Preferably the outer circumferential surface of the sleeve follows at least over certain regions the contour of the clamping surface. With a displacement of the locking component relative to the housing against the longitudinal direction, the locking component on account of friction entrains in particular the sleeve together with the clamping element, until this is clamped between the locking component and the clamping surface and a further displacement of the locking component against the longitudinal direction is thereby frictionally prevented. This state corresponds to the blocking state of the one-way clutch. If the locking component displaces relative to the housing in the longitudinal direction the locking component on account of friction entrains in particular the sleeve and the clamping element, until this can move transversely or inclined to the longitudinal direction and/or until the clamping element is no longer clamped between the locking component and the clamping surface. In this way the locking component is released, so that this can be displaced relative to the housing in the longitudinal direction. This state corresponds to the one-way state of the one-way clutch.

According to a development of the invention the sleeve is tensioned by means of a spring, so that the clamping element is forced against the locking component and also against the clamping surface. Preferably the sleeve is tensioned by means of the spring axially and/or in a direction opposite to the longitudinal direction. In this way it can be ensured that the one-way clutch can always be switched by means of the locking component from the one-way state to the blocking state. This applies in particular independently of the position of the positioning device relative to the pipe. The one-way clutch thus provides inherent locking security. If the clamping element does not abut the locking component, there is the danger that the blocking state cannot be reliably achieved.

According to a modification of the invention one or a plurality of, preferably three, clamping elements are installed in the sleeve, which respectively abut against the locking component as well as the clamping surface. Thus, apart from a uniform clamping in the blocking state a good guidance of the locking component in the one-way clutch can also be achieved. If each of the clamping elements is furthermore formed as a sphere, a ball-bearing arrangement is produced by the clamping elements, by means of which the locking component is mounted, preferably rotatably, in the one-way clutch.

If the locking component is formed by the receptacle, an inner region of the one-way clutch may still be under pressure if the receptacle is to be removed from the one-way clutch. Preferably the one-way clutch therefore includes a pressure release valve, by means of which the inner region can be ventilated. The pressure release valve is in particular secured to the housing of the one-way clutch. Preferably the pressure release valve includes an actuating element, by means of which a gas-permeable connection from the inner region to the surroundings or to a pressure release chamber can be created, so that the inner region can be ventilated. In the non-actuated state of the actuating element the pressure release valve is on the other hand preferably gas-impermeable. According to a modification of the invention the pressure release valve furthermore includes a pressure indicator, by means of which it can be shown whether the inner region is under pressure. The pressure indicator can be formed by the actuating element.

The object is or will preferably be positioned in the middle of the pipe. The term "middle" refers in particular to the cross-section of the pipe. Interfering influences on the measurement due to the inner wall of the pipe can thereby be reduced. This is in particular desirable if the pipe has a relatively small internal diameter, for example a nominal width of 40 mm to 100 mm.

According to a modification of the invention an adjusting element is movably guided on the receptacle, on which element is provided an end stop, which by displacing the adjusting element relative to the receptacle can be brought to abut against a counter-surface of the receptacle, wherein the adjusting element is connected to the pipe with the interconnection of an additional linear one-way clutch. Preferably the adjusting element is displaceably guided on the receptacle in the introduction direction and can by displacement in the introduction direction relative to the receptacle be brought via its end stop into abutment against the counter-surface. In particular the additional one-way clutch adopts its blocking state on displacement of the adjusting element against the introduction direction. The one-way clutches are preferably formed identically. The additional linear one-way clutch has in particular an operable release device, by means of which the blocking state of the additional one-way clutch can be deactivated. According to this modification of the invention it is then possible to position the object itself in a desired position in the pipe if the internal diameter and/or the wall thickness of the pipe are unknown. To this end, in a first step the receptacle is inserted into the pipe in the introduction direction until the object with its end region facing towards the pipe or the receptacle with its end region facing towards the pipe abut against the inner wall of the pipe. Following this, in a second step the blocking state of the (first) one-way clutch is deactivated and the receptacle is displaced against the introduction direction until the end stop abuts against the counter-surface of the receptacle. A further displacement of the receptacle against the introduction direction is now blocked, since the additional one-way clutch adopts its blocking state. If the distance by which the receptacle is displaced in the first step is measured, and if in addition the external diameter of the pipe is measured, then the internal diameter of the pipe can be determined from the measured values. Since the object abuts with its pipe-side end region against the inner wall of the pipe or the receptacle abuts with its pipe-side end region against the inner wall of the pipe and the position of the object relative to this end region is known, the distance between the object and the desired position can also be determined. Preferably the adjusting element is displaced between the first step and the second step relative to the receptacle by such a distance that the end stop is at the previously determined distance from the counter-surface, so that the object is transferred to the desired position in the second step. The desired position is preferably the middle of the pipe. The adjusting element is formed for example by a traction means, for example by a cable. The formation of the adjusting element as a cable has the advantage that in the case of a pipe of large diameter, it can be flexibly guided past the latter.

A pressurised fluid in particular is introduced into the pipe. The pressurised fluid is for example compressed air or another fluid under pressure. The pressure is for example between 6 to 8 bar, but can also be up to 16 bar or more. According to a modification of the invention the fluid flows into the pipe.

The object is preferably a material object. For example, the object is an electrical component.

According to a modification of the invention the object is or includes one or at least one measurement sensors. In particular the positioning device is or includes one or at least measuring devices. In this case the receptacle can also be termed a sensor receptacle. Preferably one or at least one physical properties of the fluid introduced into the pipe can be measured by means of the object or the measurement sensor. Preferably one or at least one signal characterising this property can be emitted by means of the object or the measurement sensor, preferably an electrical signal. The physical property of the fluid includes for example the pressure and/or the temperature and/or the moisture content and/or the flow velocity and/or the flow direction of the fluid, in particular at the site of the object or measurement sensor. The measurement sensor preferably includes at least one pressure sensor and/or at least one flow sensor and/or at least one temperature sensor and/or at least one moisture sensor and/or at least one flow direction sensor and/or other sensors. The measurement sensor(s) is/are advantageously formed in each case as rod sensors.

In addition or alternatively the object is or includes in particular one or at least one sampling device, by means of which one or at least one sample of the fluid introduced into the pipe can be taken. The positioning device is or includes in this case preferably one or at least one sampling device. The sampling device is formed for example by a sealable container.

The positioning device, in particular the receptacle, is preferably sealed by means of at least one seal with respect to the guide and/or the one-way clutch. An outflow of the fluid at the interface between the receptacle and the guide and/or the one-way clutch can thus be prevented. The seal preferably forms a sealing ring, which in particular is enclosed in a bed provided on the guide and/or the one-way clutch and abuts in a sealing manner against the outer circumferential surface of the receptacle.

The receptacle can have a circular outer circumferential contour. According to a development of the invention the receptacle has an outer circumferential contour differing from a circular shape, which co-operates with an internal circumferential contour of the guide and/or of the one-way clutch differing from a circular shape, as a torsion-proof lock. In particular the internal circumferential contour of the guide and/or of the one-way clutch differing from a circular shape follows in this connection the external circumferential contour of the receptacle differing from a circular shape. Furthermore the sealing ring preferably follows the external circumferential contour of the receptacle differing from a circular shape. The sealing ring consists in particular of a flexible material. Preferably also the bed of the sealing ring is provided with an internal circumferential contour differing from a circular shape, which follows the external circumferential contour of the receptacle differing from a circular shape. Thus, despite the fact that the contours differ from a circular shape a sufficient hermeticity can be achieved by means of the sealing ring. The contours deviating from a circular shape are preferably based respectively on a circular shape that is provided with a flattened portion.

According to a development of the invention the guide includes a shut-off valve. It is therefore possible in the dismantled state of the positioning device to prevent an outflow of the fluid through the guide.

The guide can be formed by the pipe or can be secured thereto. In particular the guide is flanged onto the pipe.

Alternatively the guide can however also be fastened to the pipe by means of a clip.

The positioning device preferably extends through the wall of the pipe. For this purpose in particular a hole is provided in the wall of the pipe, through which the positioning device extends. Preferably the positioning device is arranged inside as well as outside the pipe.

If the apparatus according to the invention subsequently has to be installed on a pipe already in operation, there is a problem when forming the hole in the wall of the pipe if pressurised fluid is introduced into the latter. According to a first solution approach the pipe is disconnected before the hole is made in the wall of the pipe. This can however result in an economic disadvantage for the operator of the pipe, since this cannot be used for the duration of the installation work. For this reason there is therefore a need to be able to form the hole in the wall of the pipe even if a pressurised fluid is introduced into the pipe.

According to a second solution approach the guide containing the shut-off valve is connected, in particular rigidly, to the pipe, for example by means of the clip. A drill is then introduced into the guide, which is sealed particularly with respect to the guide. With the shut-off valve open the hole is now formed by means of the drill in the pipe wall. The drill and/or a drilling machine holding the latter is in this connection secured on the guide and/or the pipe, so that the drill after it has penetrated the pipe wall cannot be completely forced out from the guide by the pressurised fluid. After the drill has penetrated through the pipe wall, it is partly removed from the guide, so that the shut-off valve can be closed. The drill is however still located in the guide and is preferably also still sealed against the latter. The shut-off valve is now closed, following which the drill and/or the drilling machine is released from the guide and/or the pipe and the drill is completely removed from the guide. It is thus possible to form the hole in the wall of the pipe even if pressurised fluid is introduced into the pipe.

According to a modification the guide includes a guide tube connected, preferably rigidly connected, to the pipe, in which the shut-off valve is arranged. In particular the guide tube opens out into the pipe. The positioning device and/or the receptacle is/are preferably displaceably guided in the guide tube in the introduction direction. Preferably the positioning device and/or the receptacle extends through the guide tube, in particular in the open state of the shut-off valve. In order to close the shut-off valve the positioning device and/or the receptacle is preferably partly removed from the guide tube, in particular against the introduction direction, until the shut-off valve can be actuated. The shut-off valve can now be converted to its locked state.

According to another modification the guide includes a first articulated part that is securely, in particular rigidly, fixed to the pipe and a second articulated part rotatably mounted on the first part, which together with the first articulated part forms the shut-off valve. The shut-off valve can be actuated by swivelling the second articulate part and forms in particular a swivel bearing. The articulated parts include respectively a feed-through hole, wherein the feed-through holes are aligned with one another in an open state of the shut-off valve and are preferably connected to one another in a flow-conducting manner. Each of the feed-through holes advantageously extends through the respective articulated part. In particular the feed-through hole of the first articulated part opens out into the pipe. Starting from the open state the shut-off valve can be switched to the closed state by swivelling the second articulated part, in which the feed-through holes are not aligned with one another and preferably also do not have a flow-conducting connection with one another. By swivelling the second articulated part in the opposite direction the shut-off valve can be switched again from the closed state to the open state. In the closed state of the shut-off valve the feed-through holes are in particular sealed against one another, preferably by means of the articulated parts and/or by means of a seal. Preferably the first articulated part includes a sealing ring, which extends around the feed-through hole of the first articulated part and abuts against the second articulated part. Preferably the sealing ring forms the aforementioned seal. In particular the sealing ring in the open state as well as in the closed state of the shut-off valve hermetically abuts both articulated parts. According to this modification the guide can be formed in a particularly compact manner in the introduction direction. In particular the guide is formed particularly short in the introduction direction, so that also the positioning device and/or the receptacle can be formed particularly short in the introduction direction.

The one-way clutch is preferably securely, in particular rigidly, connected to the second articulated part. Preferably the one-way clutch is screwed onto the second articulated part.

The positioning device and/or the receptacle is preferably displaceably guided in the feed-through hole of the second articulated part and/or in at least one of the feed-through holes and/or in the feed-through holes in the introduction direction. Preferably the positioning device and/or the receptacle extends through the feed-through holes, in particular in the open state of the shut-off valve. In order to close the shut-off valve the positioning device and/or the receptacle is preferably withdrawn from the feed-through hole of the first articulated part, in particular against the introduction direction, until the second articulated part can swivel.

Advantageously the feed-through hole of the second articulated part in the closed state of the shut-off valve is open as far as a bearing surface of the first articulated part, against which abuts the second articulated part. An automatic ventilation of the second articulated part can thus take place, since the bearing surface of the first articulated part in particular does not seal the feed-through hole of the second articulated part against the surroundings. A separate pressure release valve can therefore be dispensed with. If the one-way clutch is connected to the second articulated part, then a ventilation of the one-way clutch can also take place together with the ventilation of the second articulated part.

Figure 2:
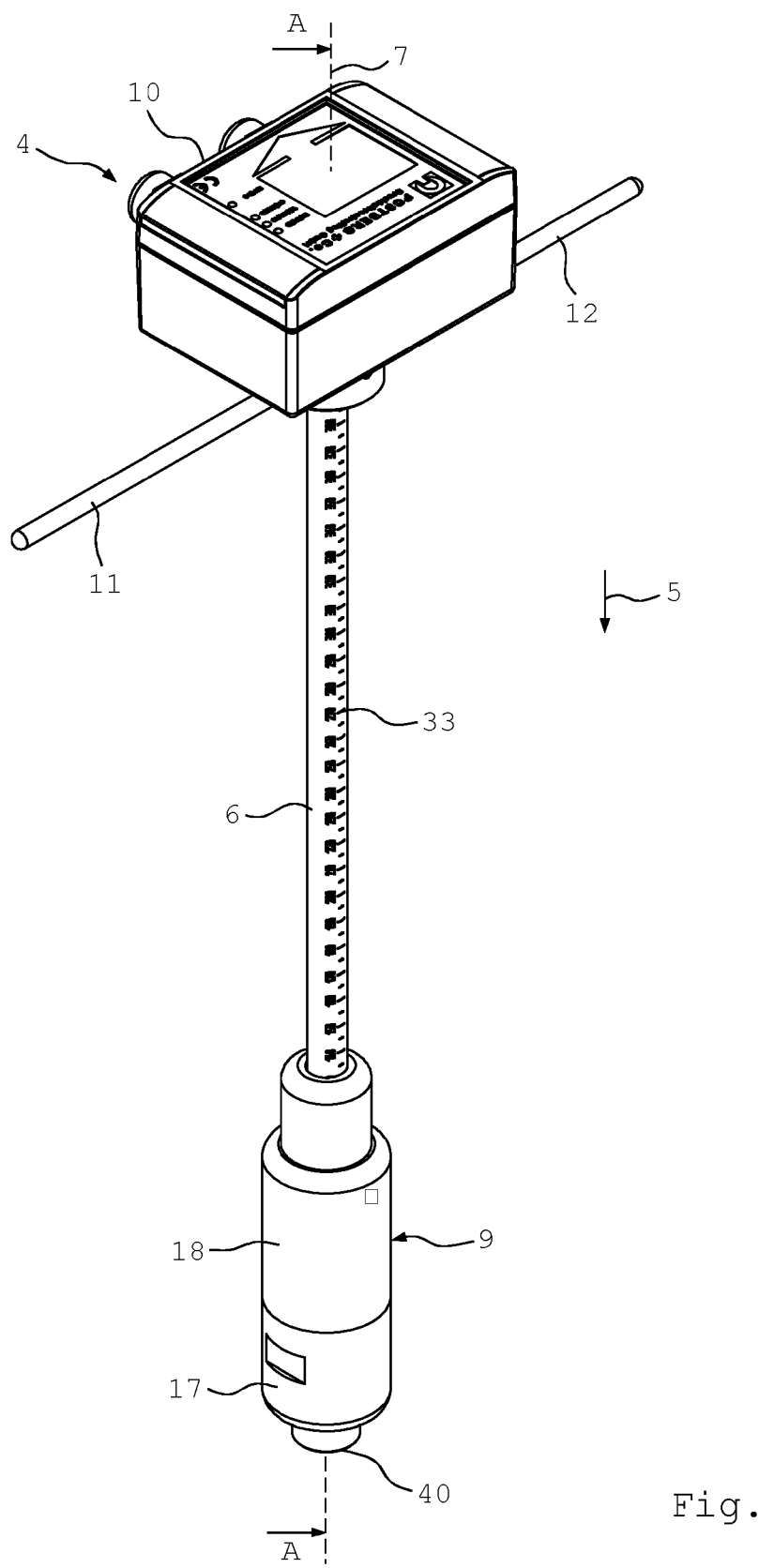
Figure 3:
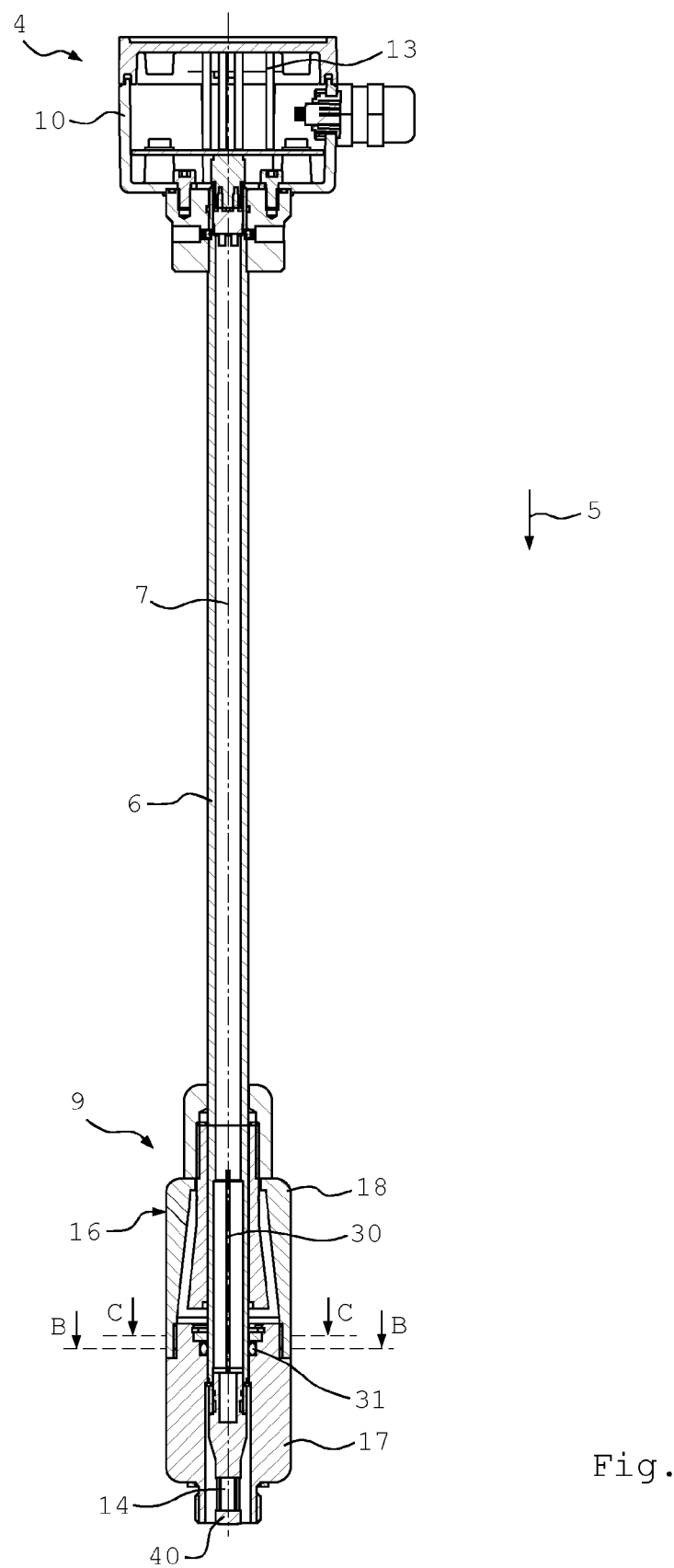
Figure 4:
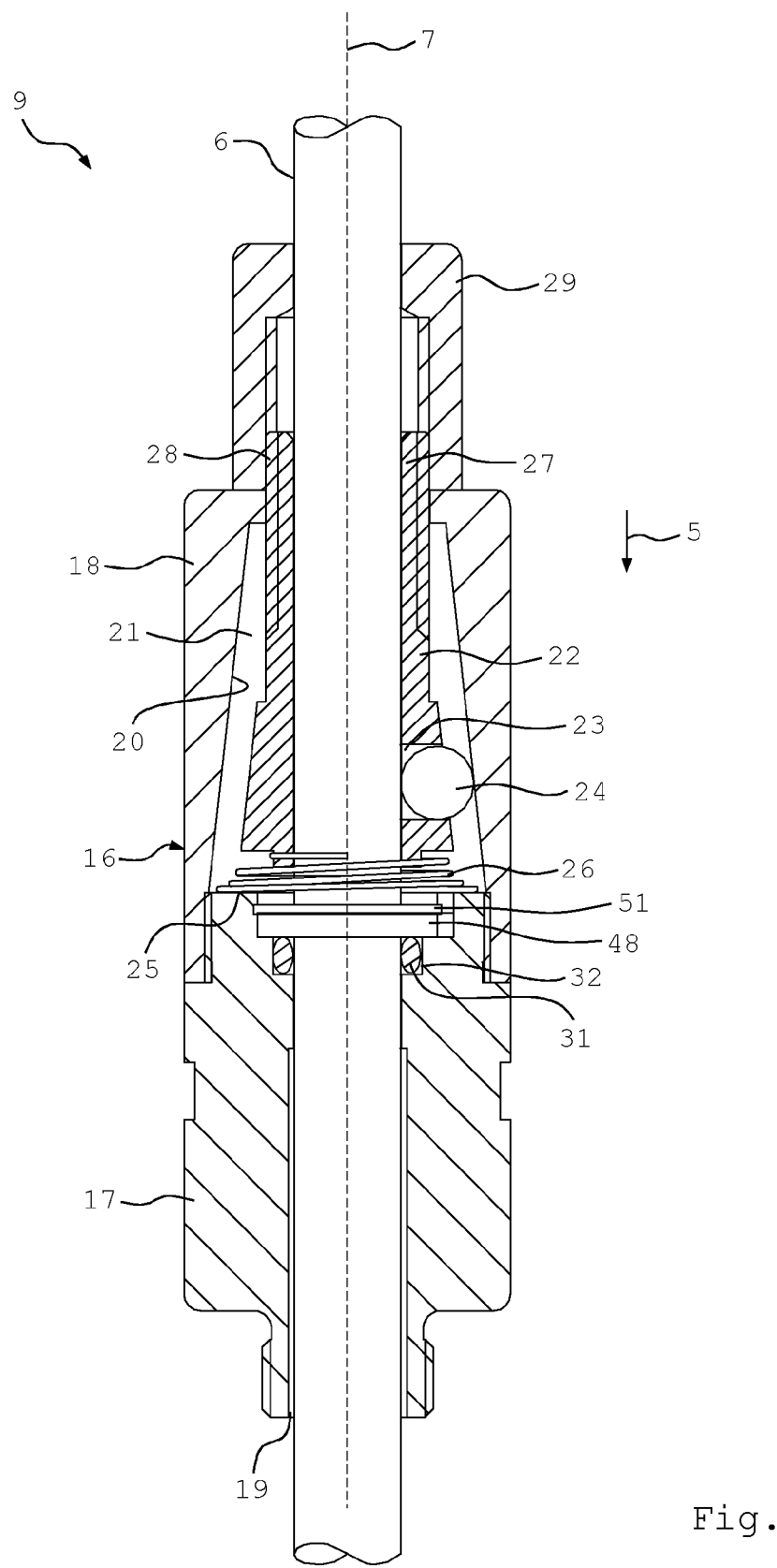
Figure 5:
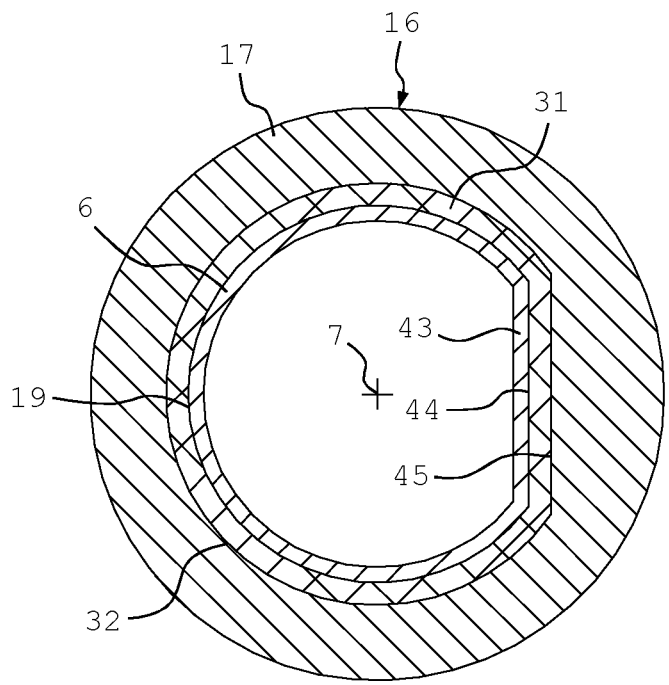
Figure 6:
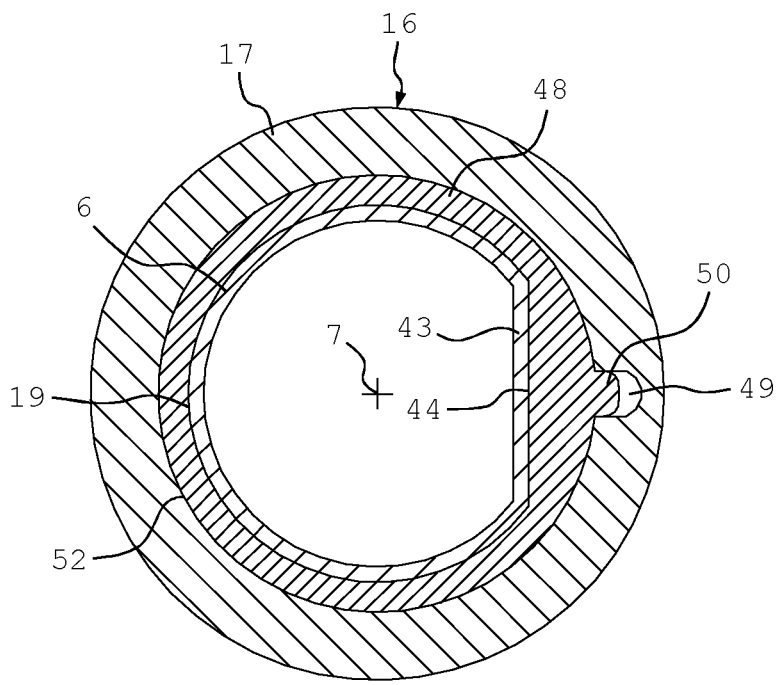
Figure 7:
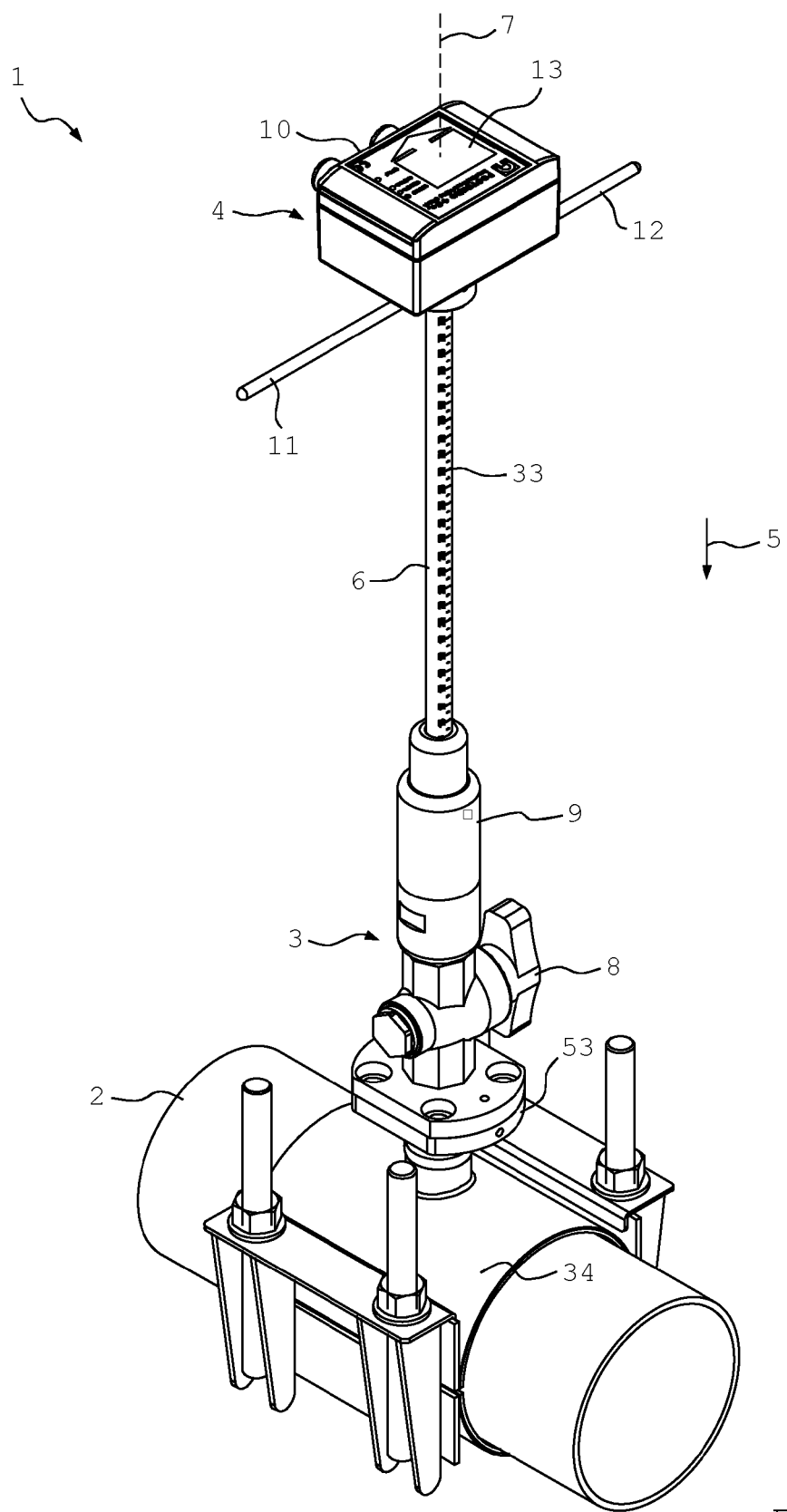
Figure 8:
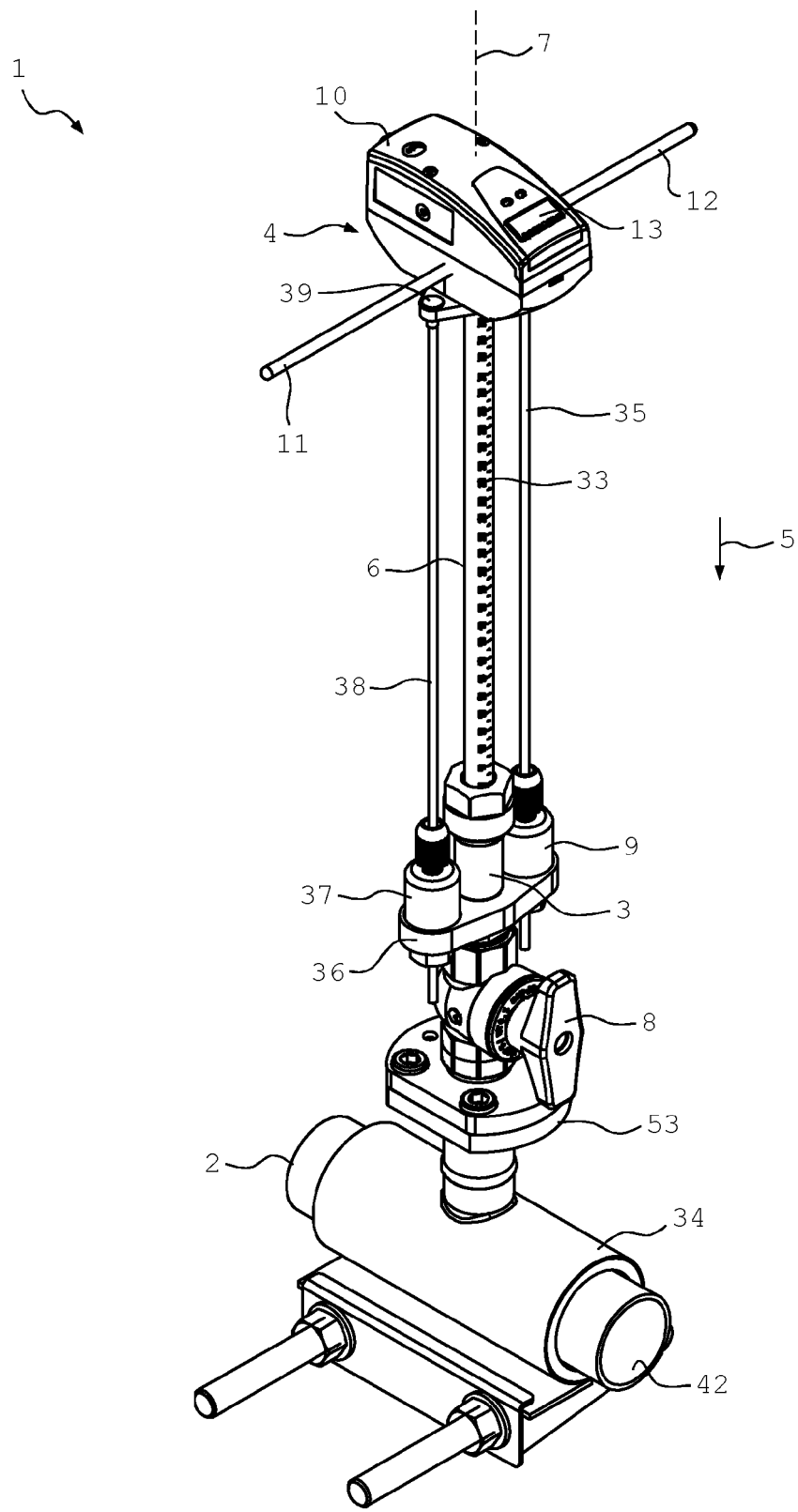
Figure 9:
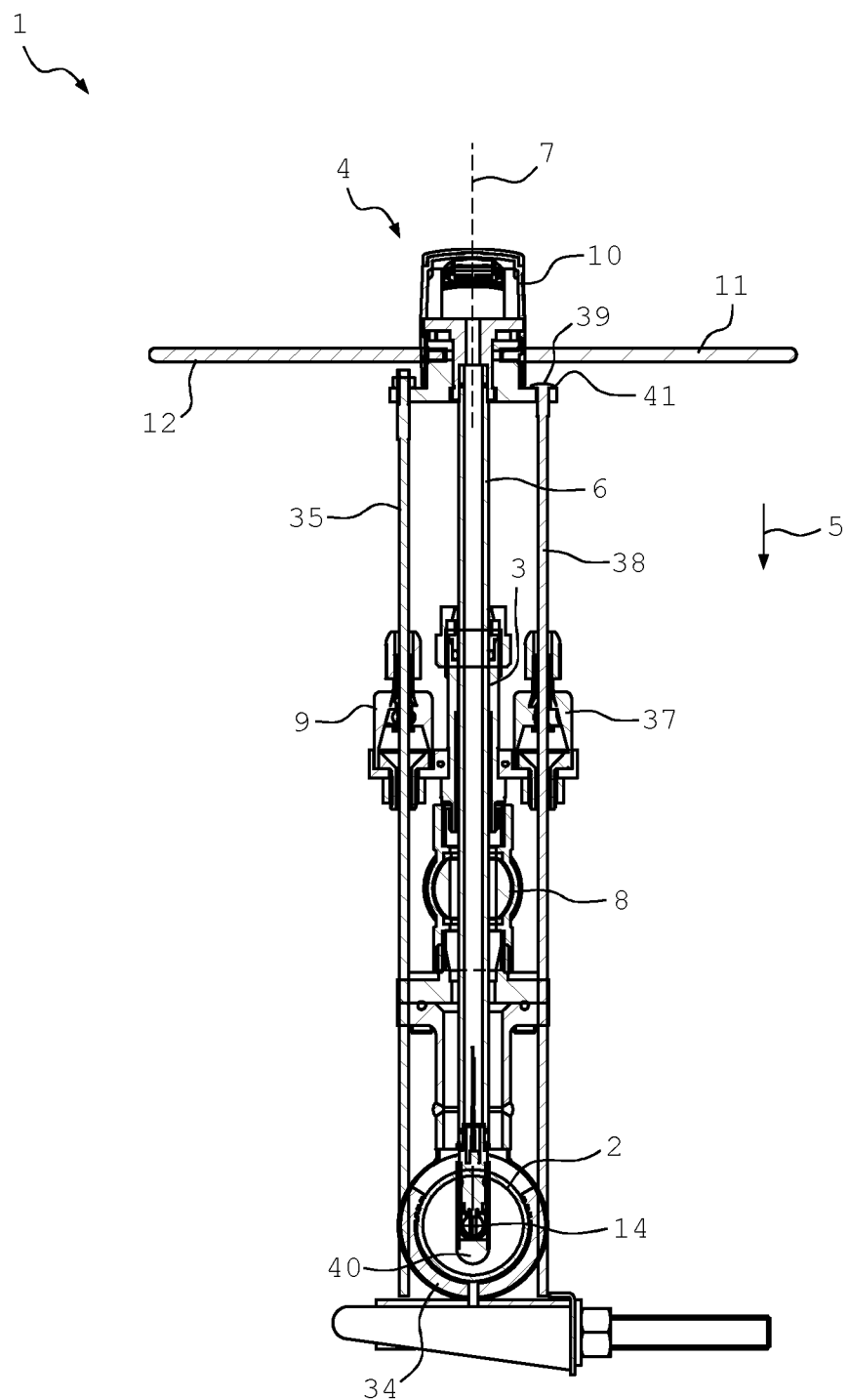
Figure 10:
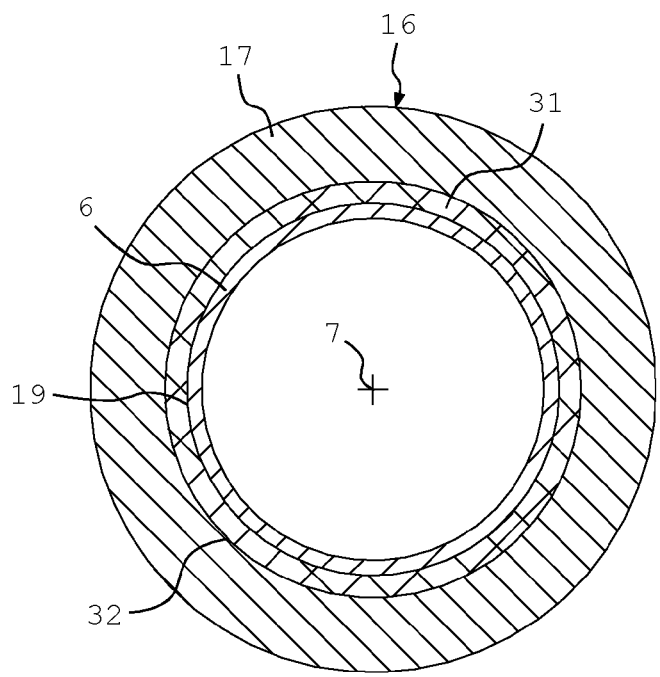
Figure 11:
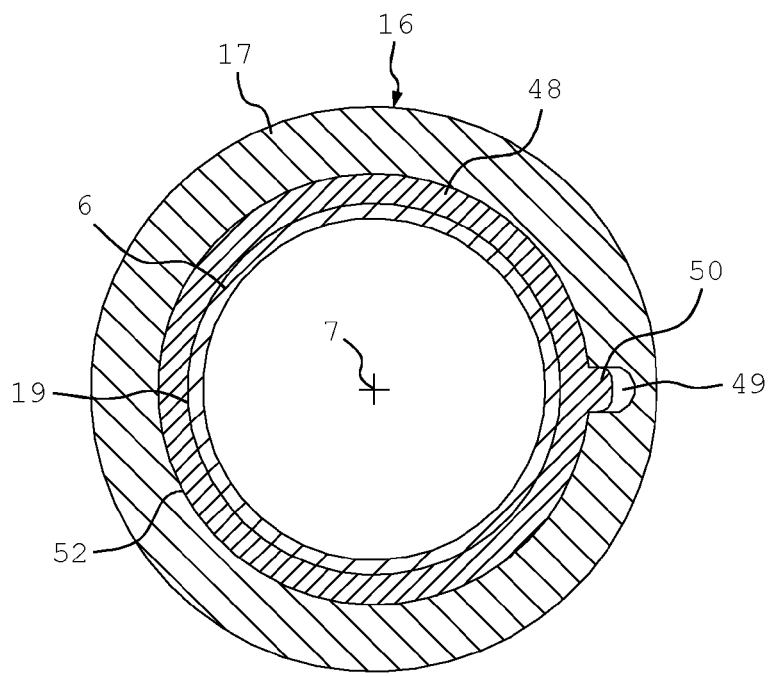
Figure 12:
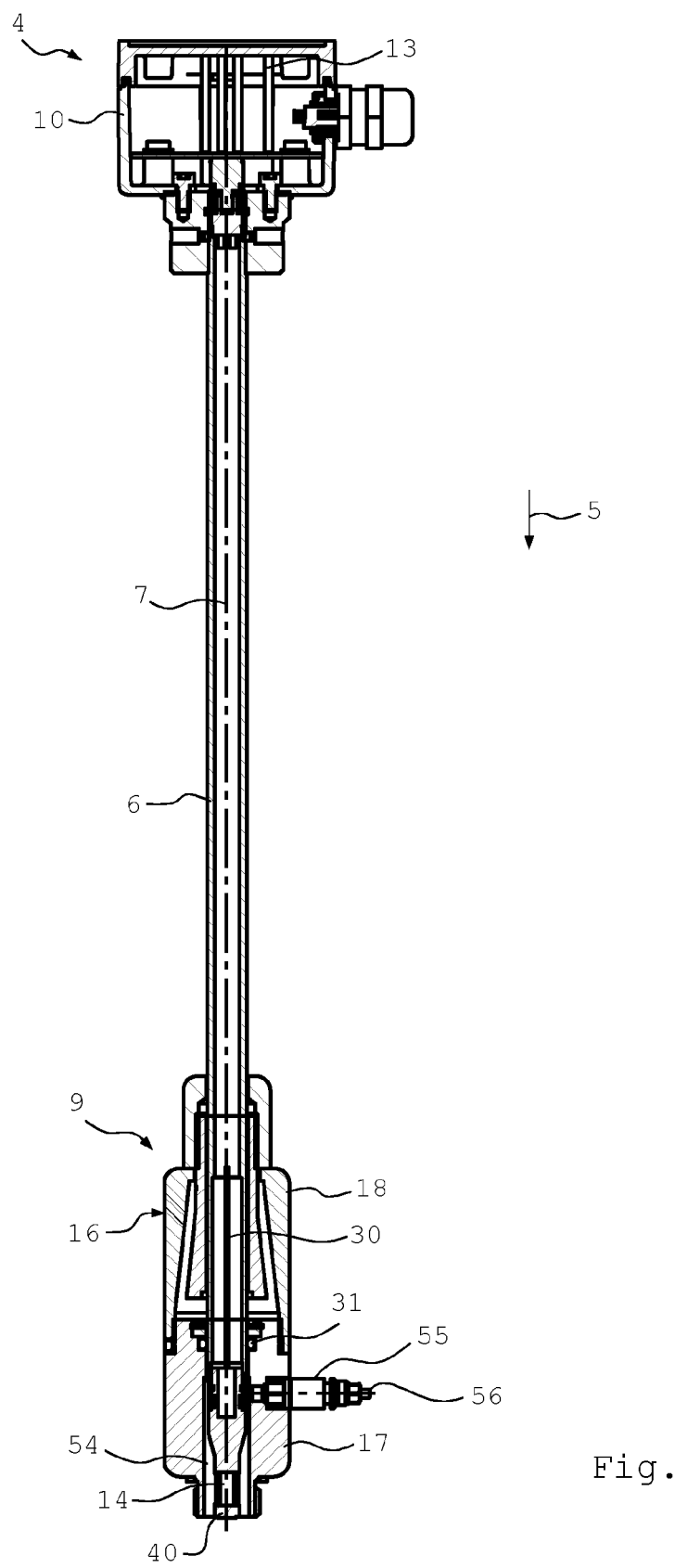
Figure 13:
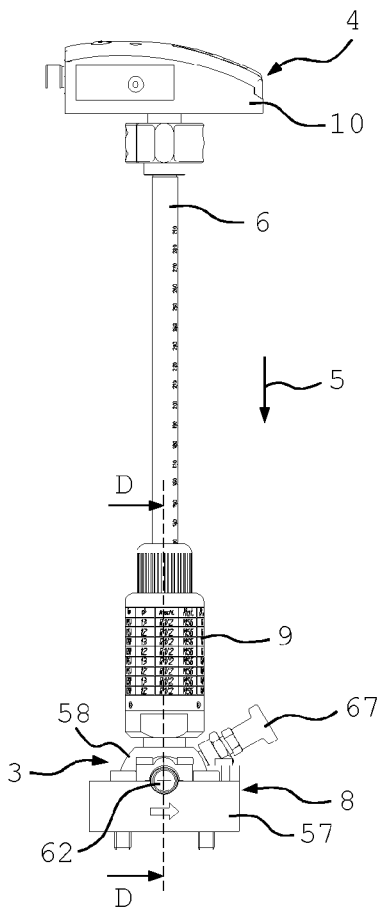
Figure 14:
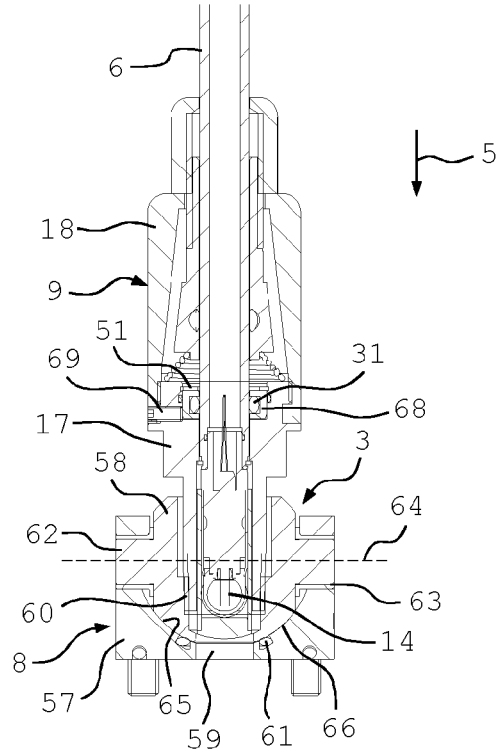
Figure 15:
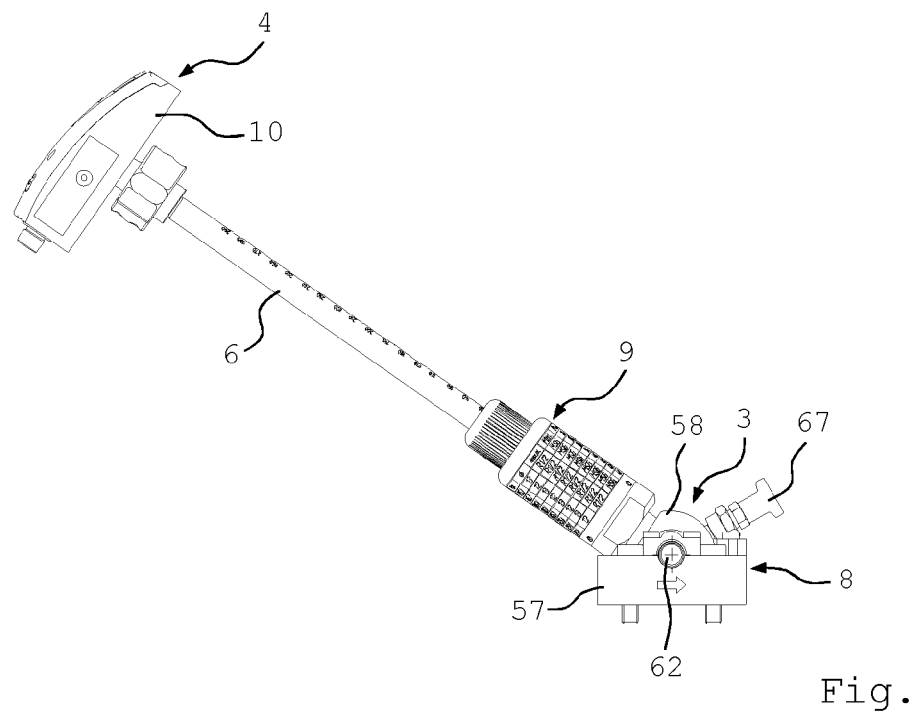

The invention is described in more detail hereinafter with the aid of preferred embodiments and with reference to the accompanying drawings, in which:

FIG. 1 is a perspective representation of an apparatus according to a first embodiment of the invention, FIG. 2 is a perspective representation of a measuring device and a one-way clutch according to the first embodiment, FIG. 3 is a longitudinal section through the measuring device and through the one-way clutch according to the first embodiment along the sectional line A-A visible in FIG. 2, FIG. 4 is a longitudinal section through the one-way clutch according to the first embodiment, FIG. 5 is a cross-section through the one-way clutch according to the first embodiment along the sectional line B-B visible in FIG. 3, FIG. 6 is a cross-section through the one-way clutch according to the first embodiment along the sectional line C-C visible in FIG. 3, FIG. 7 is a perspective representation of an apparatus according to a second embodiment of the invention, FIG. 8 is a perspective representation of an apparatus according to a third embodiment of the invention, FIG. 9 is a longitudinal section through the apparatus according to the third embodiment, FIG. 10 is a cross-section through the one-way clutch along the sectional line B-B visible in FIG. 3 according to a modification of the first embodiment, FIG. 11 is a cross-section through the one-way clutch along the sectional line C-C visible in FIG. 3 according to a modification of the first embodiment, FIG. 12 is a longitudinal section through the measuring device and through the one-way clutch according to a modification of the first embodiment along the sectional line A-A visible in FIG. 2, FIG. 13 is a side view of an apparatus according to a fourth embodiment of the invention in an unswivelled state, FIG. 14 is a sectional view of the apparatus according to the fourth embodiment along the sectional line D-D visible in FIG. 13, and FIG. 15 is a side view of the apparatus according to the fourth embodiment in a swivelled state.

FIGS. 1 to 6 show different representations and partial representations of an apparatus 1 according to a first embodiment of the invention, wherein a guide 3 is flanged onto a pipe 2, a positioning device in the form of a measuring device 4 being displaceably guided in an introduction direction 5. The measuring device 4 includes a tubular receptacle 6, which is also termed a sensor receptacle and whose longitudinal mid axis running in the introduction direction 5 is identified by the reference numeral 7. The guide 3 includes a shut-off valve 8 and a linear one-way clutch 9, which allows a displacement of the sensor receptacle 6 in the introduction direction 5 and blocks a displacement of the sensor receptacle 6 in the opposite direction. At its end remote from the pipe 2 a housing 10 with two handles 11 and 12 is secured to the sensor receptacle 6, which housing includes a measuring electronics unit 13 that is electrically connected to an object in the form of a measurement sensor 14 (see FIG. 3), which is fastened to the end region 40 of the sensor receptacle 6 facing towards the pipe 2. A pressurised fluid, preferably compressed air, is introduced into the interior 15 of the pipe 2, which when the shut-off valve 8 is open forces the measuring device 4 against the introduction direction 5. If an operator takes hold of the handles 11 and 12 and displaces the measuring device 4 in the introduction direction 5, work is therefore performed against the pressure of the fluid. If the operator releases the measuring device 4, the one-way clutch 9 thus prevents the measuring device 4 from being displaced against the introduction direction 5 on account of the pressure of the fluid. The flange 53 serving for the flange connection of the guide 3 is secured to the pipe 2, preferably welded to the latter, so that the first embodiment is suitable in particular for relatively high pressures (e.g. 40 bars).

The shut-off valve 8 serves to enable the measuring device 4 to be removed from the pipe 2 and dismantled. In the removed or dismantled state of the measuring device 4 the shut-off valve 8 is closed or becomes closed, so that the fluid cannot flow out from the pipe 2 through the guide 3. If on the other hand the measuring device 4 is installed, the shut-off valve 8 is open. In addition a measurement socket 46 is provided at the shut-off valve 8, to which can be attached a measuring instrument, by means of which a property of the fluid can be measured. Such a shut-off valve is known for example from U.S. Pat. No. 5,560,392. For example, the pressure or the moisture content of the fluid can be measured by means of the measuring instrument. According to FIG. 1 the measurement socket 46 is hermetically sealed with a blind closure 47.

FIG. 2 shows a perspective representation of the measuring device 4 and the one-way clutch 9, wherein the end region 40 is visible at the lower end of the sensor receptacle 6. So that the measurement sensor 14 can be positioned in a defined position within the pipe 2, a length scale 33 is provided on the sensor receptacle 6, by means of which the path by which the sensor receptacle 6 is displaced relative to the one-way clutch 9 and/or the pipe 2 in the introduction direction 5 can be measured.

FIG. 3 shows a sectional view through the measuring device 4 and through the one-way clutch 9 along the longitudinal mid axis 7, wherein electrical leads 30 running in the sensor receptacle 6 are indicated, by means of which the measurement sensor 14 is connected to the measuring electronics unit 13. A sealing ring 31 is also shown, which is enclosed in a bed 32 provided in the one-way clutch 9 (see FIG. 4) and which seals the sensor receptacle 6 against the one-way clutch 9. In this connection the sealing ring 31 is pressed by means of a disc 48 (see FIG. 4) in the introduction direction 5 against the floor of the bed 32. The outer circumference of the sensor receptacle 6 as well as the inner circumference of a feed-through hole 19 passing through the one-way clutch 9 (see FIG. 4), through which the sensor receptacle 6 extends, are respectively provided with a flat portion 43, 44 (see FIG. 5), so that the sensor receptacle 6 is prevented by positive engagement on the one-way clutch 9 from rotating relative to the one-way clutch 9 about the longitudinal mid axis 7. In addition the bed 32 of the sealing ring 31 has a flat portion 45 (see FIG. 5), so that the sealing ring 31 adapts in a sealing manner to the outer circumference of the sensor receptacle 6 as well as to the inner circumference of the bed 32.

According to a modification of the first embodiment the outer circumference of the sensor receptacle 6 as well as the inner circumference of the feed-through hole 19 are each of circular shape. In this case the flat portion of the bed 32 is omitted, so that the latter has a circular shape. Furthermore the feed-through hole through the disc 48 is circular. The modification of the first embodiment allows a rotation of the sensor receptacle 6 about the longitudinal mid axis 7 relative to the one-way clutch 9. Apart from these differences the modification of the first embodiment is in particular constructed identically to the first embodiment, so that as regards the further description of the modification of the first embodiment reference is made to the description of the first embodiment. Cross-sections of the modification of the first embodiment are illustrated in FIGS. 10 and 11, wherein FIG. 10 shows a cross-section through the one-way clutch 9 along the section line B-B visible in FIG. 3, and FIG. 11 shows a cross-section through the one-way clutch 9 along the section line C-C visible in FIG. 3.

Another sectional view of the one-way clutch 9 along the longitudinal mid axis 7 is shown in FIG. 4, in which compared to FIG. 3 the one-way clutch 9 is in particular rotated about the longitudinal mid axis 7. The one-way clutch 9 includes a housing 16, which comprises a first housing part 17 securely connected to the shut-off valve 8 and a second housing part 18 that is screwed on to the first housing part 17. Alternatively the two housing parts 17 and 18 can however also be connected to one another by for example a bayonet closure. The first housing part 17 preferably consists of stainless steel, since it can come into contact with the fluid. The second housing part 18 preferably consists of brass. The feed-through hole 19, in which the sensor receptacle 6 is enclosed, extends through the housing 16 in the direction of the longitudinal mid axis 7. The second housing part 18 includes a conical inner circumferential clamping surface 20, which borders an interior space 21 of the housing 16 and forms a clamping surface. A sleeve 22 is displaceably arranged in the interior space 21 in the introduction direction 5, the sensor receptacle 6 being passed through the sleeve 22. A feed-through hole 23, which extends transverse to the longitudinal mid axis 7, is formed in the wall of the sleeve 22. In addition a clamping element 24 formed as a sphere, which can move transversely to the longitudinal mid axis 7 relative to the sleeve 22, is enclosed in the feed-through hole 23. A spring 26 is arranged between a housing floor 25 formed by the first housing part 17 and a front side of the sleeve 22 facing towards the housing wall 25, the spring forcing the sleeve 22 in a direction opposite to the introduction direction 5. The clamping element 24 thus abuts the sensor receptacle 6 as well as the clamping surface 20. A plurality of, in particular three, feed-through holes extending transversely to the longitudinal mid axis 7 are preferably provided in the wall of the sleeve 22, in each of which a clamping element 24 is enclosed, which can move transversely to the longitudinal mid axis 7 relative to the sleeve 22. If the clamping elements are each formed as a sphere, then these preferably form a spherical collar, by means of which the sensor receptacle 6 is supported by a ball bearing arrangement in the one-way clutch 9. In the modification of the first embodiment this allows the sensor receptacle 6 to be easily rotated, so that the measurement sensor 14 can be aligned in a simple manner.

If the sensor receptacle 6 is displaced in the introduction direction 5 it entrains the clamping element 24 as well as the sleeve 22 as a result of frictional contact, so that the clamping element 24 is displaced to a larger diameter of the internal circumferential clamping surface 20. The clamping element 24 can thus move transversely to the longitudinal mid axis 7, so that the sensor receptacle 6 can be displaced relative to the one-way clutch 9 in the introduction direction 5. If on the other hand the sensor receptacle 6 is displaced in a direction opposite to the introduction direction 5, then the sensor receptacle 6 entrains the clamping element 24 and the sleeve 22 as a result of frictional contact, so that the clamping element 24 is displaced to a smaller diameter of the clamping surface 20. The clamping element 24 thus fixes the sensor receptacle 6 in a frictionally locking manner on the clamping surface 20, so that a displacement of the sensor receptacle 6 in the direction opposite to the introduction direction 5 is blocked.

The sleeve 22 extends with its end region 27 remote from the housing wall 25 outwardly from the housing 16, the end region 27 being provided with a thread 28 onto which a nut 29 is screwed. According to FIG. 4 the nut 29 is supported on the housing 16 and holds the sleeve 22 in a position in which the sensor receptacle 6 is secured frictionally on the clamping surface 20 by means of the clamping element 24. In this state the one-way clutch 9 is inactive. The nut 29 thus forms a locking device, by means of which the sensor receptacle 6 can be fixed on the one-way clutch 9. If the nut 29 is loosened, the sleeve 22 can move in the introduction direction 5, so that the one-way clutch 9 is ready for operation. In addition, in the loosened or partially loosened state of the nut 29 the sleeve 22 can by means of the end region 27 be displaced in the introduction direction 5, so that the end region 27 forms a release device by means of which the blocking state of the one-way clutch 9 can be deactivated, so that in the deactivated state of the one-way clutch 9 the sensor receptacle 6 can be displaced in the opposite direction to the introduction direction 5. The displacement of the end region 27 in the introduction direction 5 can however also take place by means of the nut 29 if this is not completely screwed on to the end region 27. The spring 26 ensures that the sleeve 22 is moved opposite to the introduction direction 5 and the one-way clutch 9 is thus automatically restored to its operational state, when the sleeve 22 is no longer forced via its end region 27 in the introduction direction 5.

A cross-section through the one-way clutch 9 along the sectional line B-B according to FIG. 3 can be seen in FIG. 5, which explains the behaviour of the sealing ring 31. For the modification of the first embodiment the corresponding cross-section can be seen in FIG. 10.

In addition FIG. 6 shows a cross-section through the one-way clutch 9 along the sectional line C-C according to FIG. 3, according to which an annular groove 52 and a radial groove 49 open to the latter is provided in the housing 16, the disc 48 enclosed in the annular groove 52 engaging with the radial groove via a lug 50 provided on its outer circumference. The disc 48, which in particular serves to exert pressure uniformly on the sealing ring 31 in the introduction direction 5, is thus prevented from rotating relative to the housing 16. For the modification of the first embodiment the corresponding cross-section can be seen in FIG. 11. The disc 48 is secured axially on the housing 16 by means of a locking ring 51 (see FIG. 4).

According to a variant a housing insert 68 (see FIG. 14) arranged in the first housing part 17 can be provided, which includes the bed 32 and the sealing ring 31. It is thus possible by changing the housing insert to use the one-way clutch 9 with sensor receptacles 6 of different external diameters, without having to change the whole housing part 17. The housing insert 68 is preferably of circular shape and is connected in particular in a torque-resistant manner with respect to the longitudinal mid axis 7, to the first housing part 17. Advantageously at least one externally accessible fastening means, such as for example a screw 69 (see FIG. 14), is introduced and/or screwed into the housing 16 to form this torque-resistant connection, wherein the housing insert 68 is fixed to the locking means in the first housing part 17, and in particular is clamped by pressure exerted by the locking means on the housing insert 68. It is therefore possible by releasing the locking means to rotate the housing insert 68 by means of the sensor receptacle 6 relative to the housing 16 about the longitudinal mid axis 7, if the sensor receptacle 6 is provided with the flat portion 43. The flat portion 44 of the feed-through hole 19 is then preferably provided only in the housing insert 68 and/or in the part of the feed-through hole 19 that passes through the housing insert 68. Advantageously the housing insert 68 is axially fixed with a locking ring 51 in the housing part 17. The disc 48 may be provided or omitted. For example, the disc 48 forms an integral constituent of the housing insert 68. In this case the disc 48 is preferably rigidly connected to the housing insert and/or is formed in one piece with the latter. In particular however the lug 50 is omitted, so that a rotation of the housing insert 68 is not hindered.

FIG. 7 shows a device according to a second embodiment of the invention, in which similar or identical features to the first embodiment have been identified with the same reference numerals as in the first embodiment. The second embodiment differs from the first embodiment simply in that the guide 3 is fastened by means of a clip 34 to the pipe 2. The flange 53 serving for the flange connection of the guide 3 is fastened, preferably welded, to the clip 34, so that the second embodiment is suitable in particular for relatively low pressures (e.g. 16 bars). For the further description of the second embodiment reference is made to the description of the first embodiment.

FIG. 8 is a perspective view of a device 1 according to a third embodiment of the invention, in which similar or identical features to the preceding embodiments are identified with the same reference numerals as in the preceding embodiments. In addition FIG. 9 shows a section of the device 1 according to the third embodiment along the longitudinal mid axis 7 visible in FIG. 8. According to the third embodiment a cable 35 is secured to the sensor receptacle 6, which is passed through a one-way clutch 9 that is fastened by means of a holder 36 to the guide 3 and is arranged next to the latter. In contrast to the preceding embodiments, the one-way clutch 9 according to the third embodiment thus does not form part of the guide 3 for the sensor receptacle 6. If the measuring device 4 is displaced in the introduction direction 5, then the cable 35 too also runs through the one-way clutch 9 in the introduction direction 5, so that the one-way clutch 9 adopts its one-way state. If the sensor receptacle 6 on the other hand moves in a direction opposite to the introduction direction 5, the one-way clutch 9 adopts its blocking state and blocks the cable 35, which thus secures the sensor receptacle 6 on the holder 36. A further displacement of the measuring device 4 against the introduction direction 5 is therefore no longer possible.

Furthermore an additional one-way clutch 37 is fastened to the holder 36, which is formed similarly to the one-way clutch 9. An adjusting element in the form of a cable 38 is passed through the one-way clutch 37, wherein the cable is displaceably guided on the sensor receptacle 6 in and opposite to the introduction direction 5 and has at one end an end stop 39, which can be brought to bear against a counter-surface 41 of the sensor receptacle 6. The cable 38, the counter-surface 41 and the one-way clutch 37 form an adjusting device, by means of which the measurement sensor 14 can be positioned preferably centrally in the pipe 2. For this, the sensor receptacle 6 is inserted into the pipe 2 until its end region 40 facing towards the pipe 2 abuts against the inner wall 42 of the pipe 2. The internal diameter of the pipe 2 can now be calculated by measuring the external diameter of the pipe 2 and by taking a reading on the length scale 33. The cable 38 is then displaced in the introduction direction 5 or in the opposite direction relative to the one-way clutch 37, until the distance between the end stop 39 and the counter-surface 41 of the sensor receptacle 6 corresponds to half the calculated internal diameter minus the distance between the measurement sensor 14 and the front-side end of the end region 40. If for this purpose the cable 38 has to be moved opposite to the introduction direction 5, the one-way clutch 37 is released by means of its release device. The one-way clutch 37 then has to be restored however to its operating state. Following this the one-way clutch 9 is released by means of its release device, so that the measuring device 4 can be displaced against the introduction direction 5, until the end stop 39 abuts against the counter-surface 41. The one-way clutch 37 now blocks a further displacement of the sensor receptacle 6 against the introduction direction 5. The measurement sensor 14 is thus positioned in the middle of the pipe 2, without there being any danger that the measuring device 4 will be forced out too far from the pipe 2 on account of the pressure prevailing in the pipe. For the further description of the third embodiment, reference is made to the description of the preceding embodiments.

If the receptacle 6 extends through the one-way clutch 9, such as for example in the first embodiment, the interior 54 of the guide 3 between the shut-off valve 8 and the sealing ring 31 can still be under pressure even if the shut-off valve 8 is closed. This pressure can act in an interfering manner when removing the sensor receptacle 6 from the one-way clutch 9, so that according to a development of the first embodiment the guide 3 comprises a pressure release valve 55, by means of which the interior 54 can be ventilated. This can be seen in FIG. 12, which shows a longitudinal section through the measuring device 4 and through the one-way clutch 9 according to the modification of the first embodiment along the sectional line A-A visible in FIG. 2. The pressure release valve 55 comprises an actuating element 56 in the form of a pin, by means of which the pressure release valve 55 can be actuated. If the actuating element 56 is forced in to the pressure release valve 55, this frees a gas-permeable connection from the interior 54 to the surroundings, so that the interior 54 is ventilated. In the non-actuated state of the actuation element 56 the pressure release valve 55 is gas-impermeable. The actuating element 56 forms furthermore a pressure indicator. If the interior 54 is under pressure, the actuating element 56 then projects from the pressure release valve 55. If on the other hand the interior 54 is not under pressure, the actuating element 56 does not project from the pressure release valve 55. The pressure release valve 55 is fastened to the housing 16 of the one-way clutch 9. Apart from these differences, the development of the first embodiment is in particular constructed identically to the first embodiment, so that for the further description of the development of the first embodiment reference is made to the description of the first embodiment. The pressure release valve 55 can be provided in all embodiments in which the receptacle 6 extends through the one-way clutch 9.

A device according to a fourth embodiment of the invention can be seen in different representations in FIGS. 13 to 15, in which similar or identical features to the preceding embodiments are identified with the same reference numerals as in the preceding embodiments. The fourth embodiment is based on the first or on the second embodiment, except that in contrast to these embodiments the guide 3 includes a swivel bearing. The guide 3 also includes a first articulated part 57 and a second articulated part 58 rotatably mounted in the latter about a swivel axis 64, the second articulated part 58 together with the first articulated part 57 constituting the swivel bearing that forms a shut-off valve 8. The articulated parts 57 and 58 include respectively a feed-through hole 59 and 60, wherein the feed-through holes 59 and 60 are aligned with one another in an un-swivelled state of the swivel bearing, corresponding to an open state of the shut-off valve 8. The first articulated part 57 is fastened with its lower end in particular to the flange 53 visible in FIG. 1 or FIG. 7, a description of the flange being omitted here. In addition the feed-through hole 59 is connected in particular in a flow-conducting manner to the interior 15 of the pipe 2, which also is not illustrated here.

The sensor receptacle 6 is enclosed in the feed-through hole 60 and is displaceably guided in this in the introduction direction 5, so that the sensor receptacle 6 together with the measurement sensor 14 can be introduced through the feed-through hole 59 into the interior 15 of the pipe 2. In addition the sensor receptacle 6 extends through the one-way clutch 9, which is securely connected to the second articulated part 58. The feed-through hole 19 of the one-way clutch 9 is in this connection aligned with the feed-through hole 60. The first articulated part 57 includes a sealing ring 61 surrounding the feed-through hole 59, which seals the two articulated parts 57 and 58 against one another. In the open state of the shut-off valve 8, visible in FIG. 13 and FIG. 14, the sealing ring 61 also surrounds the feed-through hole 60.

The second articulated part 58 engages via two oppositely facing bearing pins 62 extending in the direction of the swivel axis 64, in bearing recesses 63 of the first articulated part 57 and is slidably mounted therein. In addition the first articulated part 57 slidably abuts with a bearing surface 65 against a bearing surface 66 of the second articulated part 58. If the second articulated part 58 is swivelled about the swivel axis 64 relative to the first articulated part 57, the bearing surface 66 overlaps the feed-through hole 59. The bearing surface 66 is thus in contact with the sealing ring 61, which seals the feed-through hole 59 against the bearing surface 66, so that the shut-off valve 8 adopts its closed state, which can be seen in FIG. 15. For reasons of security the shut-off valve 8 also includes a locking element 67, by means of which the two articulated parts 57 and 58 can be locked to one another in the open state as well as in the closed state of the shut-off valve 8. For the further description of the fourth embodiment reference is made to the description of the preceding embodiments.

The invention claimed is:

1. An apparatus for introducing an object into a pipe comprising:
   a guide disposed on an end of a pipe;
   a positioner displaceably guided on the pipe in an introduction direction by means of the guide, the positioner supporting an object for introduction into the pipe by displacing the positioner in the introduction direction;
   a linear one-way clutch coupling the positioner to the pipe, wherein the linear one-way clutch adopts a blocking state when the positioner is displaced in a direction opposite the introduction direction; and
   wherein the linear one-way clutch adopts a one-way state when the positioner device is displaced in the introduction direction.

2. The apparatus according to claim 1, wherein the linear one-way clutch further comprises a release mechanism that is operable to deactivate the blocking state.

3. The apparatus according to claim 1, wherein the linear one-way clutch further comprises a clamping mechanism that is actuated by displacement of the positioning device.

4. The apparatus according to claim 1, wherein the positioner comprises a receptacle displaceable within the pipe in the introduction direction, wherein the object is arranged on an end region of the receptacle facing towards the pipe.

5. The apparatus according to claim 4, further comprising:
an adjusting element displaceably guided on the receptacle; and
an end stop provided on the adjusting element such that displacement of the adjusting element relative to the receptacle can be brought to bear against a counter-surface of the receptacle, wherein the adjusting element is connected to the pipe with the interconnection of an additional linear one-way clutch.

6. The apparatus according to claim 1, wherein the positioner comprises a locking component that co-operates with the linear one-way clutch.

7. The apparatus according to claim 6, wherein the positioner further comprises a receptacle displaceable within the pipe in the introduction direction, wherein the object is arranged on an end region of the receptacle facing towards the pipe, and wherein the locking component is disposed on the receptacle.

8. The apparatus according to claim 6, wherein the locking component is formed by at least one cable.

9. The apparatus according to claim 6, wherein the linear one-way clutch comprises a housing, through which the locking component extends in the introduction direction, a clamping surface provided in the housing and extending in an inclined manner in an introduction opening, and at least one movable clamping element arranged between the locking component and the clamping surface, which is operable to abut against the locking component and against the clamping surface.

10. The apparatus according to claim 9, wherein the clamping surface provided in the housing extends in a curved manner in the introduction opening.

11. The apparatus according to claim 9, wherein a displaceable sleeve is arranged in the housing, through which said sleeve the locking component extends and in which the clamping element is mounted.

12. The apparatus according to claim 11, wherein the clamping surface is formed by a conical internal circumferential surface of the housing in the introduction direction.

13. The apparatus according to claim 12, wherein at least one feed-through hole angularly oriented relative to the introduction direction is provided in a wall of the sleeve, in which the clamping element is enclosed.

14. The apparatus according to claim 12, wherein the sleeve is tensioned by means of a spring, so that the clamping element is forced against the locking component as well as against the clamping surface.

15. The apparatus according to claim 1, wherein the positioner extends through the wall of the pipe.

16. The apparatus according to claim 1, wherein the pipe has a pressurized fluid introduced therein.

17. The apparatus according to claim 16, wherein the object comprises at least one measurement sensor for measuring at least one physical property of the pressurized fluid.

18. An apparatus for introducing a measurement sensor into a pipe comprising:
a guide disposed on an end of a pipe;
a positioner displaceably guided on the pipe in an introduction direction by means of the guide, the positioner operable to support and to introduce into the pipe at least one measurement sensor for measuring a physical property of a pressurized fluid in the pipe; and
a linear one-way clutch coupling the positioner to the pipe, wherein the linear one-way clutch adopts a blocking state when the positioner is displaced in a direction opposite the introduction direction.

19. An apparatus for introducing an object into a pipe comprising:
a guide disposed on an end of a pipe;
a positioner displaceably guided on the pipe in an introduction direction by means of the guide, the positioner supporting a measurement sensor for introduction into the pipe by displacing the positioner in the introduction direction;
a linear one-way clutch coupling the positioner to the pipe, wherein the linear one-way clutch adopts a blocking state when the positioner is displaced in a direction opposite the introduction direction;
wherein the pipe has a pressurized fluid introduced therein; and
wherein the measurement sensor forms a sensor for measuring at least one physical property of the pressurized fluid.

* * * * *